Sept. 29, 1936.  E. J. PROTIN  2,056,112

PIPE JOINT

Filed Dec. 27, 1934

INVENTOR
Edward J. Protin,
By Archworth Martin,
Attorney.

Patented Sept. 29, 1936

2,056,112

UNITED STATES PATENT OFFICE 2,056,112

PIPE JOINT

Edward J. Protin, Charleroi, Pa., assignor to Pittsburgh Steel Company, Pittsburgh, Pa., a corporation of Pennsylvania Application December 27, 1934, Serial No. 759,363

2 Claims. (Cl. 285—146)

My invention relates to joints for pipes or tubes such as those employed as well pump tubing, rotary well-drilling columns, well casings, etc., and is herein shown and described as constituting an improvement upon the type of pipe joint shown in my Patent No. 1,942,518, but it will be understood that various features of the invention are applicable also to other forms of pipe joints.

In pipe joints of the type most commonly employed, the threads on the coupling and on the pipe ends are of general wedge or V form in cross section, with the result that in assembling and screwing up the sections, severe thrusting forces are exerted in directions longitudinally of the pipe against the sloping sides of the threads. There is thus set up a camming action between the threads of the pipe and the coupling threads, that tends to expand the coupling and to collapse the pipe end. Also, the radial thrusts are quite great when suspending a long string of pipe.

One object of my invention is to provide threads of such form that the longitudinal thrust forces will not be transformed into radially directed forces that tend to expand the coupling sleeve or cause collapse of the pipe.

Another object of my invention is to provide a joint wherein those sides of the threads which are exposed to longitudinally-directed thrusting forces when screwing up the joints are disposed on lines which are radial or nearly radial to the axis of the joint, and wherein clearance space is provided at the roots and tops of the threads to permit displacement of the air at such points, and to nevertheless provide for sealing fit between the assembled members at the tops and roots of their respective threads, when the members are tightly screwed together.

Figure 1:
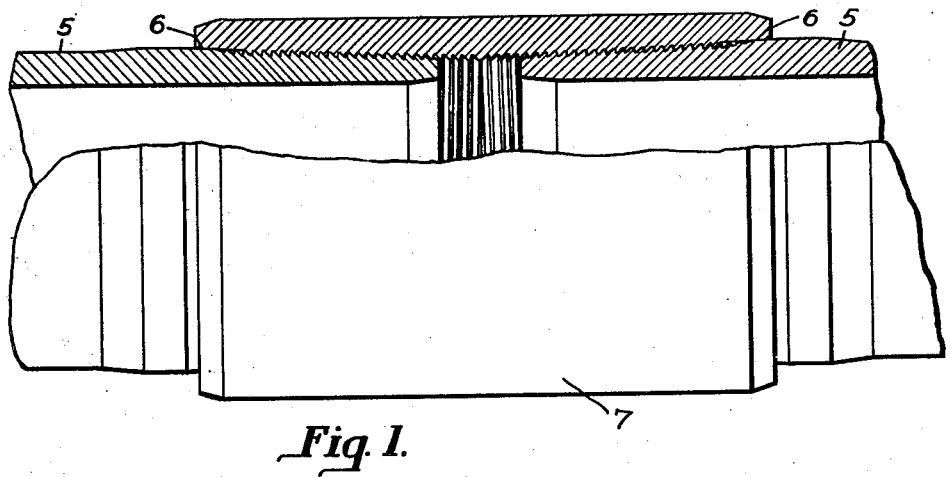
Figure 2:
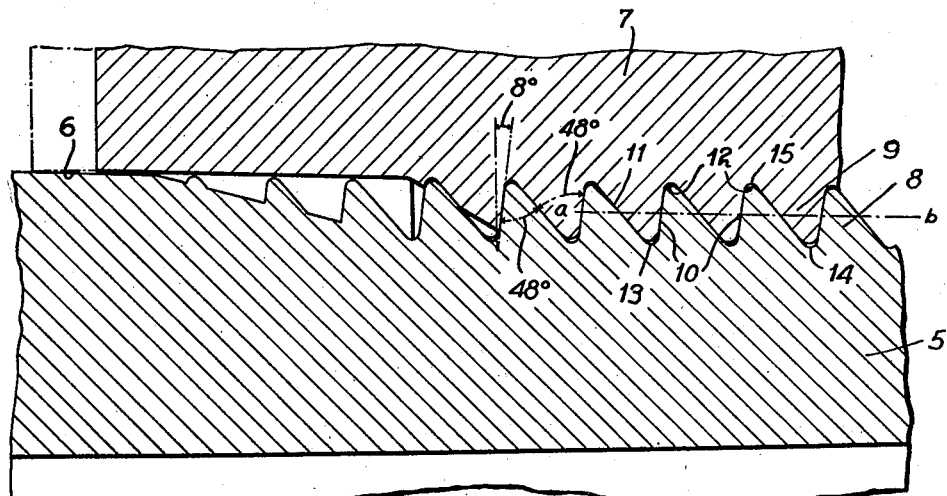
Figure 3:
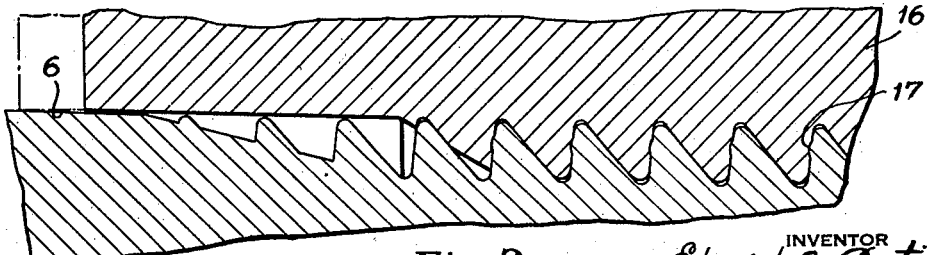

Some of the forms which my invention may take are shown in the accompanying drawing wherein Figure 1 is a longitudinal sectional view of a pipe joint; Fig. 2 is a view, on an enlarged scale, of a portion of the structure of Fig. 1, and Fig. 3 shows a modification of the structure of Fig. 2.

The pipes or tubes are indicated by the numeral 5 and may be thickened or tapered as set forth in my said patent so as to strengthen the same and provide tapered surfaces at 6 which will cooperate with complementally-tapered surfaces on a coupling sleeve 7, as set forth in my said patent. The present invention is concerned more particularly with the shape or contour of the threads of the joint.

As shown more clearly in Fig. 2, the outer faces of the pipe thread 8 and the inner faces of the coupling thread 9, as indicated at 10, are more nearly perpendicular or radial to the axis of the pipe than is usual in pipe threads. In the present case, the inclination at 10 is approximately 8 degrees relative to a radial line at that point, and is within the angle of friction of the metal. If desired, the surface 10 could be truly radial instead of at the eight-degree angle. The inner faces of the pipe thread and the faces of the coupling thread that cooperate therewith are inclined in somewhat the usual manner, as indicated at 11, and are shown as approximately 40 degrees to the perpendicular of the axis, i. e. 48 degrees with respect to the surfaces at 10. The threaded portions of the coupling and pipe will preferably be tapered ¾" per foot, as is common in pipe joints.

Since the thrusts exerted during the tightening or screwing up of the joint are imposed against the surface 10, such forces do not result in radial thrusts that if sufficiently severe would collapse the pipe ends or spread the coupling 7. The joint may therefore be screwed up more tightly than can those that employ threads of ordinary V form, with consequent better sealing of the joint.

The threads 8 have their tops and roots relieved on curved lines having a radius of .0116 inch as indicated at 12 and 13, and the top of the coupling thread relieved at 14 on curved lines having a radius of .014 inch, and the root is relieved at 15 on curved lines having a radius of .0092 inch. In other words, there is clearance to the depth of approximately .003 inch between the thread roots of each member and the thread tops of the other member.

Under the conditions stated, the joint can be screwed together until there is such distortion that the thread surfaces 12—15 and 13—14 come into snug engagement, thus making a much tighter seal than is possible with other types of thread. This expansion of the threads into said spaces will ordinarily not exceed the elastic limit of the metal.

Another advantage in having clearance at the roots and tops of the threads is that of more equal distribution of radial thrusts at all longitudinal points on the coupling. Ordinarily, if at a given point in a coupling, there is an excess of metal, the radial thrust at such point would be much in excess of radial thrusts at other points. The relief or clearance spaces permit of expansion without excessive radial stress. Further, the sections can be readily screwed together by hand to the positions shown in Fig. 2, before resorting to the use of wrenches or other tools to tighten the joint.

It will, of course, be understood that the foregoing dimensions are given merely by way of example, and that the invention is applicable to various other sizes of joints and threads.

Referring now to Fig. 3, I show a structure that is similar to the structure of Figs. 1 and 2, insofar as the general shape of the thread is concerned, but wherein the radially-extending surfaces on the threads of the coupling 16 are continuously grooved or depressed throughout their lengths, as indicated at 17. The grooves could, however, be formed on the pipe threads instead of the coupling threads. This depression may suitably be .01 inch, and at any rate, is of such shallow depth that when the joint is tightened, the metal of the pipe threads will expand into and fill the grooves 17; the metal preferably not being expanded beyond its elastic limit, so that upon unscrewing of the joint, the pipe threads will assume their original shape. The expansion of the metal into the grooves 17 is effected by the distortion of the pipe threads as the joint is tightened. The groove 17 functions somewhat as a locking shoulder for resisting such radial thrusts as might occur, especially when the joint approaches the limit of tightening movement, or when a long string of pipe is suspended from the top of a well. Clearance at the roots and tops of the threads is also provided in this structure, as in the structure of Fig. 2.

In those cases where a tapered fit is provided at the points 6, the contact between the tapering surfaces of the coupling and pipes at those points is effected simultaneously with the sealing contact at the lines of said thread relief.

I claim as my invention:—

1. Pipe joint structure comprising tapered and threaded pipe ends connected by a coupling sleeve having threaded engagement therewith, the outer faces of the pipe threads and the cooperating faces of the coupling threads being disposed on radial lines within the angle of friction and the other faces of said threads being inclined at an angle greater than the angle of friction, one of each cooperating pair of threads having a depression in its radial face into which metal of the cooperating thread may expand when the joint is screwed together, the depression being of such depth as to effect interlocking engagement that resists relative radial displacement of the threads.

2. Pipe joint structure comprising tapered and threaded pipe ends connected by a coupling sleeve having threaded engagement therewith, the outer faces of the pipe threads and the cooperating faces of the coupling threads being disposed on radial lines within the angle of friction and the other faces of said threads being inclined at an angle greater than the angle of friction, one of each cooperating pair of threads having a continuous groove in its radially-extending face, into which metal of the cooperating thread may expand when the joint is screwed together, the groove being of such depth as to effect interlocking engagement that resists relative radial displacement of the threads.

EDWARD J. PROTIN.